(12) United States Patent
Chen

(10) Patent No.: US 9,695,962 B2
(45) Date of Patent: Jul. 4, 2017

(54) FIRE RESISTANT TEXTILE SLEEVE AND METHODS OF CONSTRUCTION THEREOF AND PROVIDING FIRE PROTECTION THEREWITH

(75) Inventor: Ming-Ming Chen, West Chester, PA (US)

(73) Assignee: Federal-Mogul Powertrain LLC, Southfield, MI (US)

( * ) Notice: Subject to any disclaimer, the term of this patent is extended or adjusted under 35 U.S.C. 154(b) by 802 days.

(21) Appl. No.: 12/856,919

(22) Filed: Aug. 16, 2010

(65) Prior Publication Data

US 2012/0040114 A1   Feb. 16, 2012

(51) Int. Cl.
| | | |
|---|---|---|
| *B32B 1/08* | (2006.01) | |
| *D04C 1/06* | (2006.01) | |
| *D03D 3/02* | (2006.01) | |
| *F16L 11/12* | (2006.01) | |
| *F16L 57/04* | (2006.01) | |

(52) U.S. Cl.
CPC .......... *F16L 11/125* (2013.01); *F16L 57/04* (2013.01); *Y10T 428/1314* (2015.01)

(58) Field of Classification Search
CPC ........ D10B 2101/00; D04C 1/02; D04C 1/06; D02G 3/16; D03D 15/0016; D03D 3/02; C09K 21/00; F16L 59/00; B32B 1/08
USPC ......... 428/34.1, 34.4, 34.5, 36.1, 36.2, 36.3, 428/35.5, 36.92; 139/387 R
See application file for complete search history.

(56) References Cited

U.S. PATENT DOCUMENTS

| | | | |
|---|---|---|---|
| 2,984,590 A | 5/1961 | Anderson | |
| 3,828,119 A | 8/1974 | Warburton et al. | |
| (Continued) | | | |

FOREIGN PATENT DOCUMENTS

| | | |
|---|---|---|
| CN | 101654559 A | 2/2010 |
| DE | 3325034 | 1/1985 |
| (Continued) | | |

OTHER PUBLICATIONS

SAE Inc. Publication, Fire Testing of Flexible Hose, Tube Assemblies, Coils, Fittings and Similar System Components, AS1055, Rev. D, (2001), pp. 1-6

(Continued)

*Primary Examiner* — Camie Thompson
(74) *Attorney, Agent, or Firm* — Robert L. Stearns; Dickinson Wright, PLLC

(57) ABSTRACT

A textile sleeve constructed in accordance with one aspect of the invention provides fire protection to an oil or fuel fluid conveying conduit and meets the AS1055 Class A protection requirements at a zero flow rate and the AS1055 Class B protection requirements at a zero flow rate. The textile sleeve includes a single tubular textile wall formed from at least one of the group consisting of basalt, silica, ceramic and fiberglass yarn. The wall has an outer surface and an inner surface bounding a cavity sized for receipt of the fluid conveying conduit. A coating of silicone rubber is adhered to the outer surface of the wall, and a flame retardant additive is mixed with the silicone rubber to form a coating composition. The flame retardant additive is selected from the group consisting of at least one of zinc borate, magnesium hydroxide and aluminum hydroxide.

18 Claims, 1 Drawing Sheet

(56) References Cited

U.S. PATENT DOCUMENTS

| | | | |
|---|---|---|---|
| 5,059,651 A * | 10/1991 | Ueno | C08K 3/22 |
| | | | 174/110 V |
| 5,173,350 A | 12/1992 | Hocquellet | |
| 5,183,079 A | 2/1993 | Blin | |
| 5,232,534 A | 8/1993 | Hocquellet | |
| 6,876,797 B2 | 4/2005 | Morris | |
| 2002/0117325 A1 * | 8/2002 | Mennone et al. | 174/121 A |
| 2003/0185527 A1 | 10/2003 | Morris | |
| 2005/0194578 A1 * | 9/2005 | Morris | 254/134.3 FT |
| 2007/0207186 A1 * | 9/2007 | Scanlon et al. | 424/424 |
| 2007/0251595 A1 * | 11/2007 | Chen | 139/420 C |
| 2009/0022920 A1 | 1/2009 | Vinarsky et al. | |
| 2009/0238957 A1 | 9/2009 | Clancy | |

FOREIGN PATENT DOCUMENTS

| | | | |
|---|---|---|---|
| EP | 0127432 | | 12/1984 |
| EP | 0230564 | A1 | 8/1987 |
| GB | 2278605 | * | 7/1984 |

OTHER PUBLICATIONS

SAE, Inc. Publication, Sleeve, Hose Assembly, Fire Protection, AS1072, Rev. E, (2001), pp. 1-5.

* cited by examiner

FIRE RESISTANT TEXTILE SLEEVE AND METHODS OF CONSTRUCTION THEREOF AND PROVIDING FIRE PROTECTION THEREWITH

BACKGROUND OF THE INVENTION

1. Technical Field

This invention relates generally to textile sleeves for protecting elongate members, and more particularly to fire resistant textile sleeves.

2. Related Art

Flexible hoses and tube assemblies are known for use to protect fluid conveying conduits, e.g. fuel lines and oil lines, against exposure to heat and to provide fire resistance and fire proof barrier protection in compliance with Aerospace Standard AS1055 fire tests. In the tests, a flame having a flame intensity of 4500 Btu/hr at a flame temperature of 2000 degrees Fahrenheit is used. One Aerospace Standard (AS1055 Class B) requires maintaining a fireproof barrier for 15 minutes. Coated textile sleeves are known to meet the AS1055 Class B protection at a 5D flow rate (5 gpm) of fluid through the line being protected. Typical textile sleeves comprise a fiberglass braided sleeve having a silicone rubber coating. The base construction of fiberglass and silicone rubber coating are specified in Aerospace Standard (AS1072) as a Type 2 sleeve. Although these sleeves meet the AS1055 Class B protection at a 5D flow rate, they do not meet the AS1055 Class B protection at a 1D flow rate (1 gpm), nor another Aerospace Standard (AS1055 Class A), which requires maintaining fire resistance for 5 minutes when the flow rate is zero. Accordingly, in order to meet the AS1055 Class B protection requirements at a 1D flow rate (1 gpm), or the AS1055 Class A protection requirements at a zero flow rate, multiple sleeves needs to be overlaid about one another, which is bulky and costly.

SUMMARY OF THE INVENTION

A low profile, single wall textile sleeve constructed in accordance with one aspect of the invention meets the AS1055 Class A protection requirements at a zero flow rate and the AS1055 Class B protection requirements at a 1D (1 gpm) flow rate.

In accordance with one aspect of the invention, a textile sleeve for providing fire protection to a fluid conveying conduit includes a single tubular textile wall formed from at least one of the group consisting of basalt, silica, ceramic and fiberglass yarn. The wall has an outer surface and an inner surface bounding a cavity sized for receipt of the fluid conveying conduit. A coating of silicone rubber is adhered to the outer surface of the wall, and a flame retardant additive is mixed with the silicone rubber to form a coating composition. The flame retardant additive is selected from the group consisting of at least one of zinc borate, magnesium hydroxide and aluminum hydroxide.

In accordance with another aspect of the invention, a method of constructing a single wall textile sleeve for providing fire resistance protection to a fluid conveying conduit is provided. The method consisting of: interlacing yarn made of material selected from at least one of the group consisting of basalt, silica, ceramic and fiberglass yarn and forming a tubular wall having an outer surface and an inner surface bounding a cavity sized for receipt of the fluid conveying conduit. And further consisting of: forming a coating composition of silicone rubber and a flame retardant additive, with the flame retardant additive being selected from at least one of the group consisting of zinc borate, magnesium hydroxide and aluminum hydroxide, and applying the coating composition to the outer surface of the tubular wall.

In accordance with yet another aspect of the invention, a method of providing fire protection to a fluid conveying conduit is provided. The method comprises: wrapping a single wall textile sleeve about the fluid conveying conduit wherein the single wall has an outer surface with an outer coating composition of silicone rubber and a flame retardant additive selected from at least one of the group consisting of zinc borate, magnesium hydroxide and aluminum hydroxide adhered thereon.

BRIEF DESCRIPTION OF THE DRAWINGS

These and other aspects, features and advantages of the invention will become readily apparent to those skilled in the art in view of the following detailed description of the presently preferred embodiments and best mode, appended claims, and accompanying drawings, in which:

DETAILED DESCRIPTION OF PREFERRED EMBODIMENTS

Figure 1A:
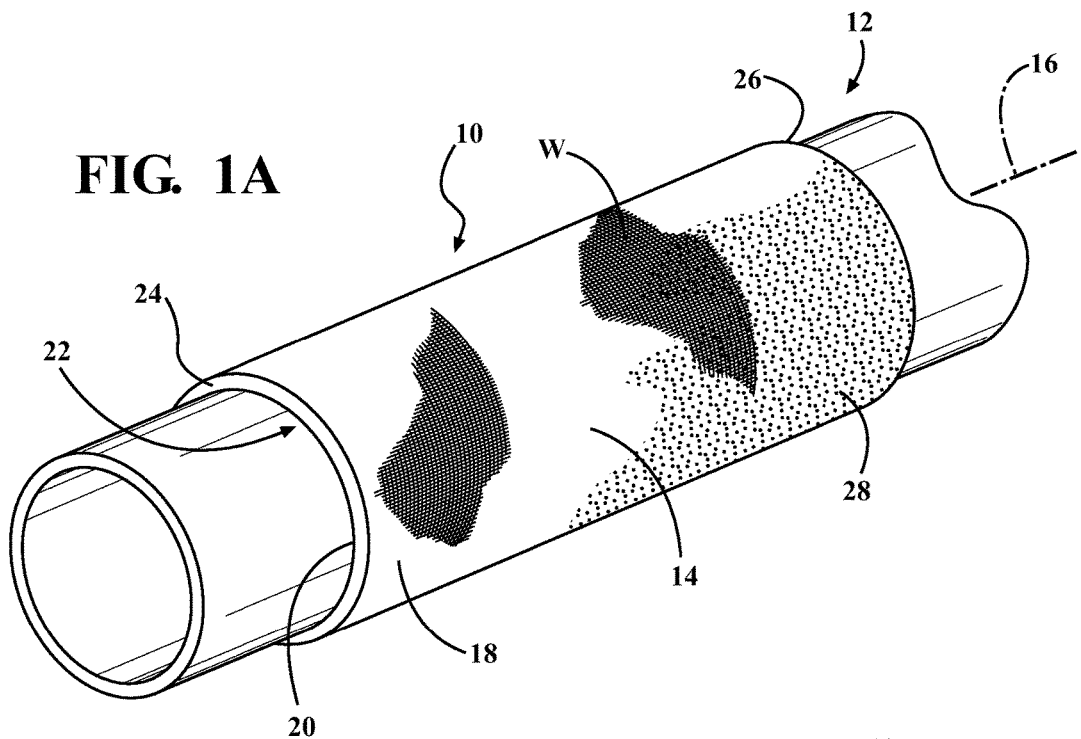
FIG. 1A is a perspective view of a textile sleeve constructed in accordance with one presently preferred embodiment of the invention shown disposed about a fuel hose or oil hose assembly.
Figure 1B:
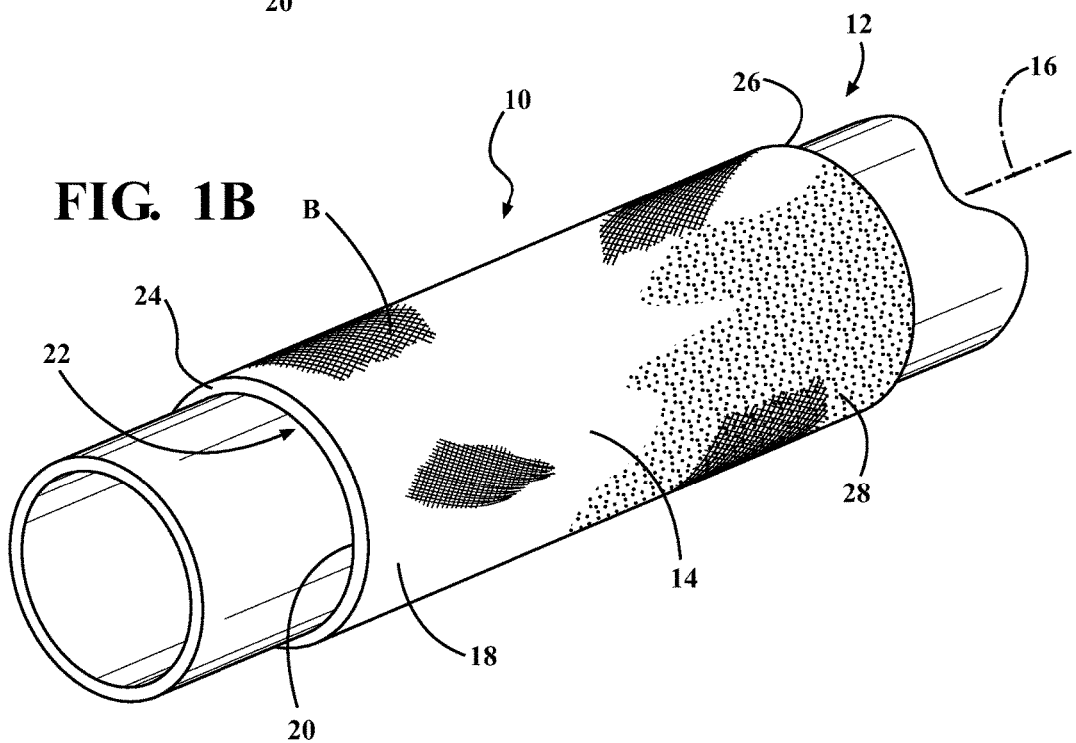
FIG. 1B is a perspective view of a textile sleeve constructed in accordance with another presently preferred embodiment of the invention shown disposed about a fuel hose or oil hose assembly.

Referring in more detail to the drawings, FIGS. 1A and 1B illustrate a tubular textile sleeve 10 constructed according to one aspect of the invention. The sleeve 10 provides fire protection to a fluid conveying conduit 12, such as those used to channel flammable fluids, e.g. oil and fuel. The sleeve 10 fire protection includes providing fire resistance in accordance with Aerospace Standard (AS1055 Class A) at 1 gpm and 0 gpm flow rates, and further in accordance with Aerospace Standard (AS1055 Class B) at 1 gpm and 0 gpm flow rates, depending on the type of yarn material used to construct the sleeve 10. Accordingly, the yarn material should be selected based on the flame protection required for the application.

The sleeve 10 has a tubular wall 14 that is either woven (as indicated at W in FIG. 1A) or braided (as indicated a B in FIG. 1B), depending on the application requirements. The wall 14 is constructed of any suitable length extending along a longitudinal axis 16 and diameter. Accordingly, the wall 14 can be constructed having various structural properties and configurations. The wall 14 has an outer surface 18 and an inner surface 20 bounding a cavity 22 sized for receipt of the conduit 12, wherein the cavity 22 extends axially along the longitudinal axis 16 between opposite ends 24, 26 of the sleeve 10. The outer surface 18 of the wall 14 has a coating composition 28 consisting of a silicone rubber and flame retardant additive. The silicone rubber can be selected from a variety of different types of silicone rubber, including HCR, RTV, extruded silicone and liquid silicone rubber (LSR), for example, wherein the silicone rubber preferably is vinyl containing polysiloxane or hydroxyl containing polysiloxane. The more reactive functional groups tested resulted in more cross-linking when the silicone rubber was cured, thereby providing enhanced adhesion between the coating composition 28 and the sleeve wall 14.

The flame retardant additive is selected from the group consisting of at least one of zinc borate, magnesium hydroxide and aluminum hydroxide. In one presently preferred embodiment, the flame retardant additive is provided as both zinc borate and magnesium hydroxide in a ratio in a ratio of 2:3, respectively, for their synergy effect, wherein the zinc borate is provided having 10 wt. % of the coating composition 28 and the magnesium hydroxide is provided having 15 wt. % of the coating composition 28. It should be understood that the ratio and percents by weight can be varied depending the application requirement, wherein the ratio of zinc borate to magnesium hydroxide can range between ½ to ¾, and the percents by weight can range from 5-20 wt. % for both. When decomposing, zinc borate releases boric acid which intumesces to form an insulating layer of char about the sleeve 10. In addition, the magnesium hydroxide decomposes above a temperature of 330 degrees Celsius, which, when decomposing, absorbs 1.37 kJ/g of heat and releases water, which acts to effectively lower the temperature of the flame and conduit 12. Accordingly, the combined synergistic physical and chemical properties of the zinc borate and magnesium hydroxide provide optimized flame protection to the sleeve 10.

The textile wall is formed from at least one of the group consisting of basalt, silica, ceramic and fiberglass yarn, depending on the application fire protection requirements. For example, if the sleeve 10 needs to meet the Aerospace Standard 1055 Class A for fire resistance at a 1D flow rate (1 gpm of fluid flowing through the conduit 12), which test includes a 5 minute burn in a flame intensity of 4500 Btu/hr at a flame temperature of 2000 degree Fahrenheit, then the sleeve wall 14 can be formed from interlaced yarn selected from at least one of the group consisting of basalt, silica, ceramic and fiberglass yarn. Otherwise, if the sleeve 10 needs to meet the Aerospace Standard 1055 Class A for fire resistance at a zero flow rate (no flow of fluid through the conduit), then the sleeve wall 14 can be formed from interlaced yarn selected from at least one of the group consisting of basalt, silica and ceramic. In addition, if the sleeve 10 needs to meet the Aerospace Standard 1055 Class B for fire proof protection at a 1D flow rate (1 gpm), which test includes a 15 minute burn in a flame intensity of 4500 Btu/hr at a flame temperature of 2000 degree Fahrenheit, then the sleeve wall 14 can be formed from interlaced yarn selected from at least one of the group consisting of basalt, silica and ceramic. And further, if the sleeve 10 needs to meet the Aerospace Standard 1055 Class B for fire proof protection at a zero flow rate, then the sleeve wall 14 can be formed from interlaced yarn selected from at least one of the group consisting of silica and ceramic.

It should be recognized that sleeve assemblies 10 constructed in accordance with the invention are suitable for use in a variety of applications, regardless of the sizes and lengths required. For example, they could be used in automotive, marine, industrial, aeronautical or aerospace applications, or any other application wherein protective sleeves are desired to protect nearby components against heat and/or fire.

It is to be understood that the above detailed description is with regard to some presently preferred embodiments, and that other embodiments readily discernible from the disclosure herein by those having ordinary skill in the art are incorporated herein and considered to be within the scope of any ultimately allowed claims.

What is claimed is:

1. A textile sleeve for providing fire protection to a fluid conveying conduit, consisting of:
   a single tubular textile wall formed from at least one of the group consisting of basalt, silica, ceramic and fiberglass yarn, said wall having an outer surface and an inner surface bounding a cavity sized for receipt of the fluid conveying conduit; and
   a coating composition adhered to said outer surface, said coating composition consisting of silicone rubber mixed with
   a flame retardant additive, said flame retardant additive consisting of zinc borate and magnesium hydroxide in a ratio of 2:3, respectively.

2. The textile sleeve of claim 1 wherein said zinc borate is provided having 10 wt. % of said coating composition.

3. The textile sleeve of claim 1 wherein said single tubular textile wall is braided.

4. The textile sleeve of claim 1 wherein said single tubular textile wall is woven.

5. The textile sleeve of claim 1 wherein said sleeve is fire proof and said single tubular textile wall is formed from basalt.

6. The textile sleeve of claim 1 wherein said sleeve is fire proof and said single tubular textile wall is formed from silica.

7. The textile sleeve of claim 1 wherein said sleeve is fire proof said single tubular textile wall is formed from ceramic.

8. The textile sleeve of claim 1 wherein said sleeve is fire resistant and said single tubular textile wall is formed from fiberglass.

9. The textile sleeve of claim 1 wherein said silicone rubber is selected from the group consisting of vinyl containing polysiloxane and hydroxyl containing polysiloxane.

10. A method of constructing a single wall textile sleeve for providing fire resistance protection to a fluid conveying conduit, consisting of:
    interlacing yarn made of material selected from at least one of the group consisting of basalt, silica, ceramic and fiberglass yarn and forming a tubular wall having an outer surface and an inner surface bounding a cavity sized for receipt of the fluid conveying conduit;
    forming a coating composition consisting of silicone rubber and a flame retardant additive mixed together, said flame retardant additive consisting of zinc borate and magnesium hydroxide in a ratio of 2:3, respectively; and
    applying the coating composition to the outer surface of the tubular wall.

11. The method of claim 10 further including providing the magnesium hydroxide having 15 wt. % of the coating composition.

12. The method of claim 10 further including interlacing the yarn using a braiding process.

13. The method of claim 10 further including interlacing the yarn using a weaving process.

14. The method of claim 10 further including selecting basalt as the yarn material to render the tubular wall fire resistant under a fire test conforming with Aerospace Standard 1055 Class A at a 0 gpm flow rate of fluid through the liquid conveying conduit and fire proof under a test conforming with Aerospace Standard 1055 Class B at a 1 gpm flow rate.

15. The method of claim 10 further including selecting silica or ceramic as the yarn material to render the tubular wall fire resistant under a fire test conforming with Aerospace Standard 1055 Class A at a 0 gpm flow rate of fluid through the liquid conveying conduit and fire proof under a test conforming with Aerospace Standard 1055 Class B at a 1 gpm flow rate.

16. The textile sleeve of claim 10 wherein said silicone rubber is selected from the group consisting of vinyl containing polysiloxane and hydroxyl containing polysiloxane.

17. A textile sleeve for providing fire protection to a fluid conveying conduit, consisting of:
- a single tubular textile wall formed from at least one of the group consisting of basalt, silica, ceramic and fiberglass yarn, said wall having an outer surface and an inner surface bounding a cavity sized for receipt of the fluid conveying conduit;
- a coating composition adhered to said outer surface, said coating composition consisting of silicone rubber and
- a flame retardant additive mixed together, said flame retardant additive consisting of zinc borate and aluminum hydroxide.

18. The textile sleeve of claim 17 wherein said silicone rubber is selected from the group consisting of vinyl containing polysiloxane and hydroxyl containing polysiloxane.

\* \* \* \* \*